United States Patent
Yoon et al.

(10) Patent No.: US 7,443,609 B2
(45) Date of Patent: Oct. 28, 2008

(54) OPTICAL LENS, OPTICAL MODULE HAVING THE SAME, AND BACKLIGHT ASSEMBLY HAVING THE SAME

(75) Inventors: Ju-Young Yoon, Suwon-si (KR);
Hye-Eun Park, Suwon-si (KR);
Chang-Ju Kim, Suwon-si (KR);
Hyun-Jin Kim, Seoul (KR); Gi-Cherl Kim, Yongin-si (KR); Sang-Yu Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/197,574

(22) Filed: Aug. 3, 2005

(65) Prior Publication Data
US 2006/0227431 A1  Oct. 12, 2006

(30) Foreign Application Priority Data
Apr. 6, 2005 (KR) ............... 10-2005-0028630

(51) Int. Cl.
*G02B 3/02* (2006.01)
*F21V 5/04* (2006.01)

(52) U.S. Cl. .............. 359/708; 362/326; 362/335

(58) Field of Classification Search ......... 359/708–712; 362/326, 335
See application file for complete search history.

(56) References Cited

U.S. PATENT DOCUMENTS 5,485,317 A * 1/1996 Perissinotto et al. ........ 359/712
5,917,660 A 6/1999 Ohtaki et al.
5,991,098 A 11/1999 Pareto et al.
6,717,355 B2 * 4/2004 Takahashi et al. .......... 313/503
6,870,681 B1 3/2005 Magee
6,961,190 B1 * 11/2005 Tamaoki et al. ............ 359/726

FOREIGN PATENT DOCUMENTS

| EP | 0681194 A | 11/1995 |
| EP | 0945 742 A | 9/1999 |
| GB | 1 176 659 A | 1/1970 |

* cited by examiner

*Primary Examiner*—Darryl J Collins
(74) *Attorney, Agent, or Firm*—MacPherson Kwok Chen & Heid LLP

(57) ABSTRACT

An optical module includes a point light source device and an optical lens. The point light source device generates light. The optical lens includes an inner curved surface and an outer curved surface. The inner curved surface has a first roughly ellipsoidal shape having a first major axis and a first minor axis that is substantially perpendicular to the first major axis. The outer curved surface has a second roughly ellipsoidal shape having a second major axis that is substantially perpendicular to the first axis and the second minor axis that is substantially perpendicular to the second major axis. The light generated by the point light source device enters the optical lens through the inner curved surface and exits from the optical lens through the outer curved surface. Therefore, the number of optical modules used in a display device may be reduced to lower manufacturing cost thereof.

40 Claims, 7 Drawing Sheets

OPTICAL LENS, OPTICAL MODULE HAVING THE SAME, AND BACKLIGHT ASSEMBLY HAVING THE SAME

CROSS-REFERENCE TO RELATED APPLICATIONS

This application relies for priority upon Korean Patent Application No. 2005-28630 filed on Apr. 6, 2005, the contents of which are herein incorporated by reference in its entirety.

BACKGROUND

1. Field of the Invention

The present invention relates to an optical lens, an optical module having the optical lens, and a backlight assembly having the optical lens.

2. Description of the Related Art

A display device converts an electric signal processed by an information processing device into a visible image. Examples of display devices include a cathode ray tube (CRT) apparatus, a plasma display panel (PDP) apparatus, a liquid crystal display (LCD) apparatus, an electro-luminance (EL) apparatus, etc.

The LCD apparatus displays an image by using electrical and optical characteristics of liquid crystal. The LCD apparatus is lightweight, has a low driving voltage, and low power consumption, etc. Therefore, the LCD apparatus is used in various fields.

An LCD apparatus displays an image by using a separate light source. In other words, the LCD panel does not emit light by itself. Therefore, the LCD apparatus requires a light source that provides an LCD panel with light.

Generally, a conventional LCD apparatus employs a light source generating a white light, such as a cold cathode fluorescent lamp (CCFL) or a flat fluorescent lamp (FFL). Recently, an LCD apparatus employing light sources that emit three basic colors separately has been developed in order to enhance color-reproducibility. The LCD apparatus employs, for example, a point light source such as a red light emitting diode (red LED), a green light emitting diode (green LED) and a blue light emitting diode (blue LED). Red light, green light and blue light generated by the red, green and blue LEDs, respectively, are matched with color filters, so that the color-reproducibility is enhanced.

However, in order to get uniform luminance by using the LEDs, the LCD apparatus employs a plurality of LEDs which increases the manufacturing cost thereof.

SUMMARY OF THE INVENTION

In accordance with the present invention, an optical lens is provided which is capable of enhancing an effective light emitting area of the point light source to reduce the total number of point light sources used.

In accordance with the present invention, an optical module having the above optical lens is provided.

In accordance with the present invention, a backlight assembly having the above optical lens is provided.

In an exemplary optical lens according to the present invention, the optical lens includes an inner curved surface and an outer curved surface. The inner curved surface has a first roughly ellipsoidal shape having a first major axis. The outer curved surface has a second roughly ellipsoidal shape having a second major axis that is substantially perpendicular to the first axis.

In an exemplary optical module according to the present invention, the optical module includes a point light source device and an optical lens. The point light source device generates light. The optical lens includes an inner curved surface and an outer curved surface. The inner curved surface has a first roughly ellipsoidal shape having a first major axis and a first minor axis that is substantially perpendicular to the first major axis. The outer curved surface has a second roughly ellipsoidal shape having a second major axis that is substantially perpendicular to the first axis and the second minor axis that is substantially perpendicular to the second major axis. The light generated by the point light source device enters the optical lens through the inner curved surface and exits from the optical lens through the outer curved surface.

In an exemplary backlight assembly according to the present invention, the backlight assembly includes a circuit board, a receiving container and a plurality of optical modules. The receiving container receives the circuit board. The optical modules are disposed on the circuit board. Each of the optical modules includes a point light source device and an optical lens. The point light source device generates light. The optical lens includes an inner curved surface and an outer curved surface. The inner curved surface has a first roughly ellipsoidal shape having a first major axis and a first minor axis that is substantially perpendicular to the first major axis. The outer curved surface has a second roughly ellipsoidal shape having a second major axis that is substantially perpendicular to the first axis and the second minor axis that is substantially perpendicular to the second major axis. The light generated by the point light source device enters the optical lens through the inner curved surface and exits from the optical lens through the outer curved surface.

In an exemplary display apparatus according to the present invention, the display apparatus includes a display panel and a backlight assembly. The display panel displays an image by using light. The backlight assembly provides the display panel with the light. The backlight assembly includes a circuit board, a receiving container and a plurality of optical modules. The receiving container receives the circuit board. The optical modules are disposed on the circuit board. Each of the optical modules includes a point light source device and an optical lens. The point light source device generates light. The optical lens includes an inner curved surface and an outer curved surface. The inner curved surface has a first roughly ellipsoidal shape having a first major axis and a first minor axis that is substantially perpendicular to the first major axis. The outer curved surface has a second roughly ellipsoidal shape having a second major axis that is substantially perpendicular to the first axis and the second minor axis that is substantially perpendicular to the second major axis. The light generated by the point light source device enters the optical lens through the inner curved surface and exits from the optical lens through the outer curved surface.

The optical lens according to the present invention has an increased effective light emitting radius, so that the number of optical modules in the display device may be reduced to lower manufacturing cost thereof. Additionally, the optical lens according to the present invention may be manufactured more easily than a conventional optical lens due to a shape thereof.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF THE EMBODIMENTS

It should be understood that the exemplary embodiments of the present invention described below may be varied modified in many different ways without departing from the inventive principles disclosed herein, and the scope of the present invention is therefore not limited to these particular flowing embodiments. Rather, these embodiments are provided so that this disclosure will be thorough and complete, and will fully convey the concept of the invention to those skilled in the art by way of example and not of limitation.

Hereinafter, the embodiments of the present invention will be described in detail with reference to the accompanied drawings.

Figure 1:
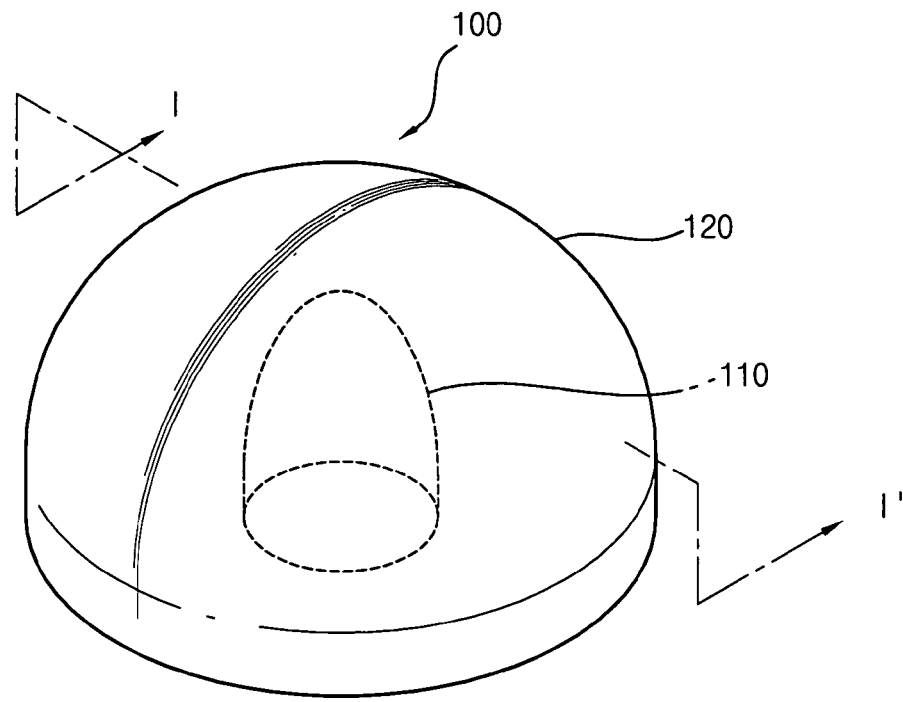
FIG. 1 is a perspective view illustrating an optical lens according to an exemplary embodiment of the present invention.
Figure 2:
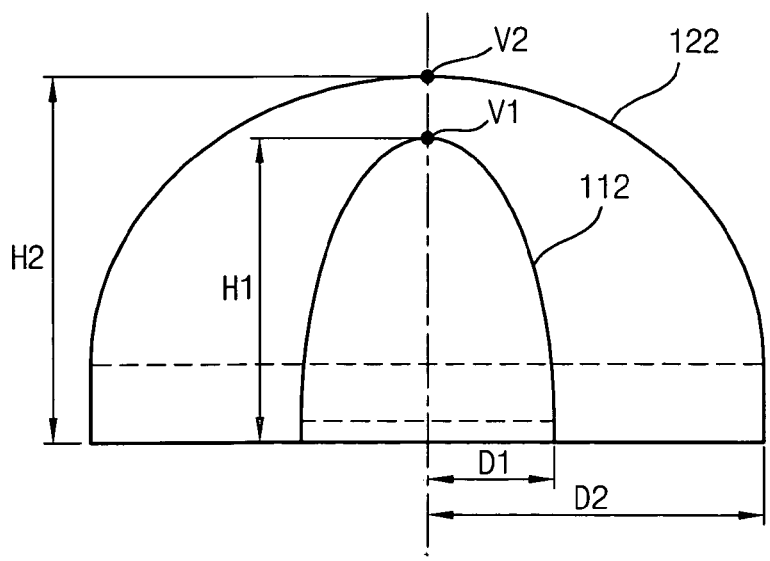
FIG. 2 is a cross-sectional view taken along a line I-I' in FIG. 1.

FIG. 1 is a perspective view illustrating an optical lens according to an exemplary embodiment of the present invention, and FIG. 2 is a cross-sectional view taken along a line I-I' in FIG. 1.

Referring to FIGS. 1 and 2, an optical lens 100 according to an exemplary embodiment of the present invention includes a hollow region.

The hollow region generates an air layer between a point light source (not shown) and the optical lens 100, when the optical lens 100 is combined with the point light source to form an optical module. As a result, the optical lens 100 includes an inner curved surface 110 and an outer curved surface 120. The light generated from the point light source enters the optical lens 100 through the inner curved surface 110, and exits from the optical lens 100 through the outer curved surface 120. Light is first refracted when the light enters the optical lens 100 through the inner curved surface 110, and then refracted again when the light exits from the optical lens 100 through the outer curved surface 120.

The inner and outer curved surfaces 110 and 120 correspond to roughly ellipsoidal surfaces. An ellipse is defined as a closed plane curve generated by a point moving in such a way that the sums of its distances from two fixed points is constant. The two fixed points are referred to as focal points. A major axis passes through the focal points, and a minor axis passes through a center of the major axis and is substantially perpendicular to the major axis. The major axis is longer than the minor axis. The ellipsoid is formed by rotating the ellipse with respect to the major axis or the minor axis to generate a three-dimensional structure.

The inner curved surface 110 corresponds to a roughly ellipsoidal surface having a first major axis. The outer curved surface 120 corresponds to a roughly ellipsoidal surface having a second major axis that is substantially perpendicular to the first major axis. When the first major axis of the inner curved surface 110 is vertical, the second major axis of the outer curved surface 120 is horizontal. When first major axis of the inner curved surface 110 is horizontal, the second major axis of the outer curved surface 120 is vertical. As a result, a thickness of the optical lens 100 (or a distance between the inner curved surface 110 and the outer curved surface 120) is not uniform.

By adjusting the major axes of the inner and outer curved surfaces 110 and 120, a light path may be adjusted to be diffused or condensed. In detail, when the major axis of the inner curved surface 110 is vertical and the major axis of the outer curved surface 120 is horizontal, the optical lens 100 diffuses light. In contrast, when the major axis of the inner curved surface 110 is horizontal and the major axis of the outer curved surface 120 is vertical, the optical lens 100 condenses light. According to the present embodiment, the inner curved surface 110 has a first roughly ellipsoidal shape having a first major axis that is substantially vertical, and the outer curved surface 120 has a second roughly ellipsoidal shape having a second major axis that is substantially horizontal.

The inner and outer curved surfaces 110 and 120 may be described using Expression 1. The optical lens 100 has a rotational symmetry with respect to z-axis of the Cartesian coordinate. Thus, when the inner and outer curved surfaces 110 and 120 are expressed by using the cylindrical coordinate, the inner and outer curved surfaces 110 and 120 may be expressed simply. Expression 1 reflects an aberration.

$$z = \frac{cr^2}{1+\sqrt{1-(1+k)c^2r^2}} + A_1 r + A_2 r^2 + \ldots + A_n r^n, \quad (1)$$

wherein 'z' represents a vertical distance from a point light source to a point of the inner or outer curved surface 110 or 120, 'r' represents a horizontal distance from the point light source to the point of the inner or outer curved surface 110 or 120, 'c' represents a curvature at a vertex, 'k' represent a conic constant, $A_1, A_2, \ldots, A_n$ represent aberration coefficients of first through n-th order terms, respectively, and 'n' represents a whole number that is equal to or less than thirty. A first term represents a quadratic curve term such as a circle, parabola, ellipse and hyperbola, and terms of m-th order of '$A_1 r^m$' are terms for curves that cannot be represented by the first term.

Hereinafter, a shape of the optical lens 100 will be explained in detail referring to Expression 1.

The inner curved surface 110 of the optical lens 100 has the first roughly ellipsoidal shape 112. The first roughly ellipsoidal shape 112 has a radius of curvature of substantially equal to or less than about 5 mm at a first apex V1 corresponding to a major axis. The radius of curvature may be expressed as 1/c, wherein 'c' represents curvature. The first roughly ellipsoidal shape 112 has the conic constant 'k' that is larger than −1 and smaller than 0, so that the first roughly ellipsoidal shape has a major axis that is vertical. Additionally, the first roughly ellipsoidal shape 112 has aberration coefficients $A_1, A_2, \ldots, A_n$ that are larger than −1 and smaller than 1. For example, the first roughly ellipsoidal shape 112 has a radius of curvature 'c' of about 1.41 mm at the first apex V1, a conic constant 'k' of about −0.68, an aberration coefficient $A_3$ of about 0.02, and the other aberration coefficients $A_1, A_2, A_4, \ldots, A_n$ of zero (0).

The outer curved surface 120 of the optical lens 100 has the second roughly ellipsoidal shape 122. The second roughly ellipsoidal shape 122 has a radius of curvature of substantially equal to or less than about 15 mm at a second apex V2 corresponding to a minor axis. The second roughly ellipsoidal shape 122 has a conic constant 'k' that is larger than 0 and smaller than 1, so that the first roughly ellipsoidal shape has a major axis that is horizontal. Additionally, the second roughly ellipsoidal shape 122 has aberration coefficients $A_1, A_2, \ldots, A_n$ that are larger than −1 and smaller than 1. For example, the second roughly ellipsoidal shape 122 has a radius of curvature 'c' of about 8.09 mm at the second apex V2, a conic constant 'k' of about 0.82, and aberration coefficients $A_1, A_2, \ldots, A_n$ of zero (0).

A size of the optical lens 100 is determined in accordance with a size of the point light source. For example, a first radius D1 from a center of the optical lens 100 to the inner curved surface 110 is about 2.5 mm, and a second radius D2 from the center of the optical lens 100 to the outer curved surface 120 is about 6 mm. Additionally, a first height H1 from a bottom face of the optical lens 100 to the first apex V1 is about 4.8 mm, and a second height H2 from the bottom face of the optical lens 100 to the second apex V2 is about 5.7 mm.

The optical lens 100 according to the present embodiment has an increased effective light emitting radius, so that the number of optical modules used for a backlight assembly may be reduced to lower the manufacturing cost of the display apparatus. Additionally, the optical lens 100 may be manufactured more easily than the conventional optical lens 200 due to a shape thereof.

Figure 3:
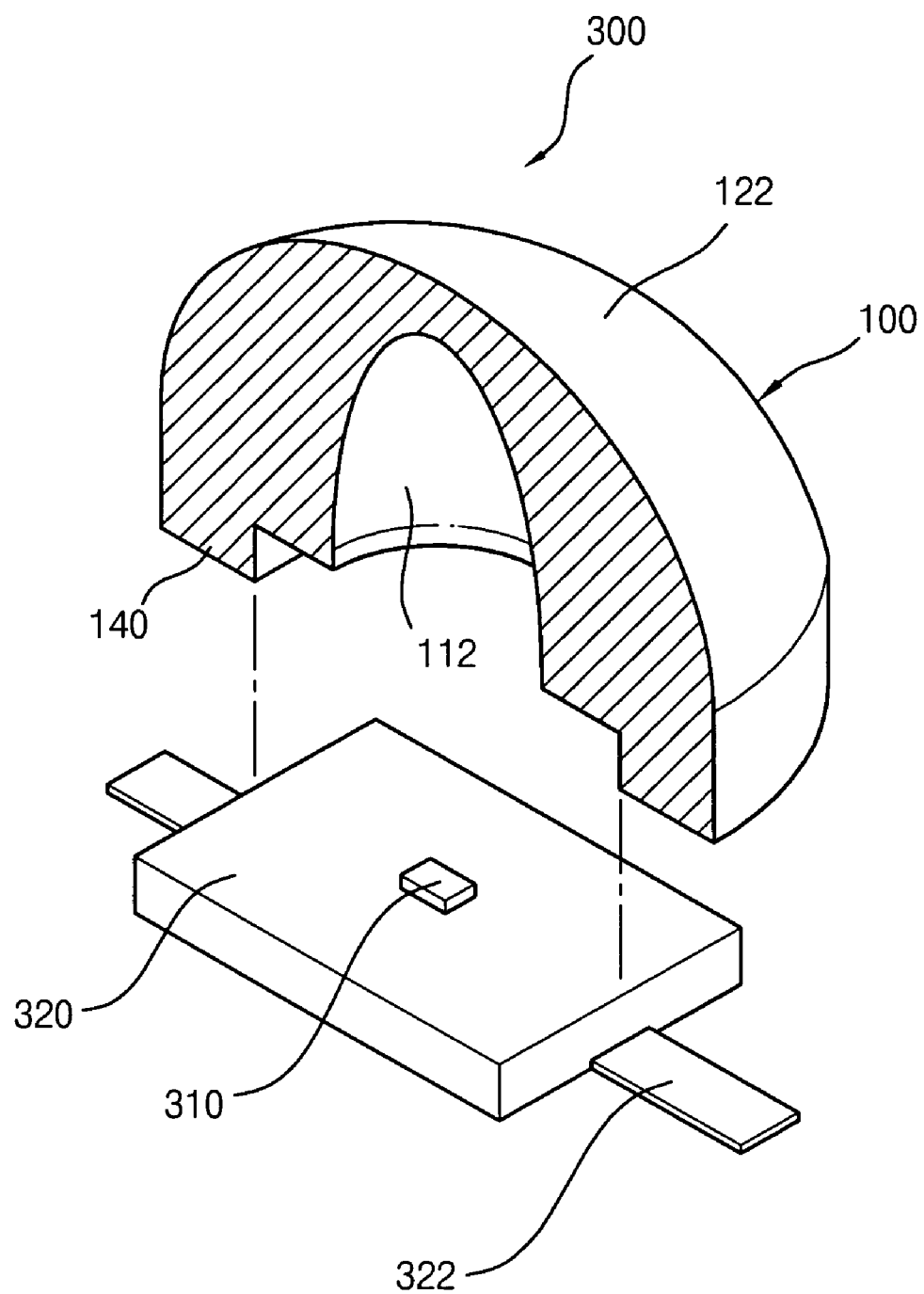
FIG. 3 is an exploded perspective view illustrating an optical module according to an exemplary embodiment of the present invention.
Figure 4:
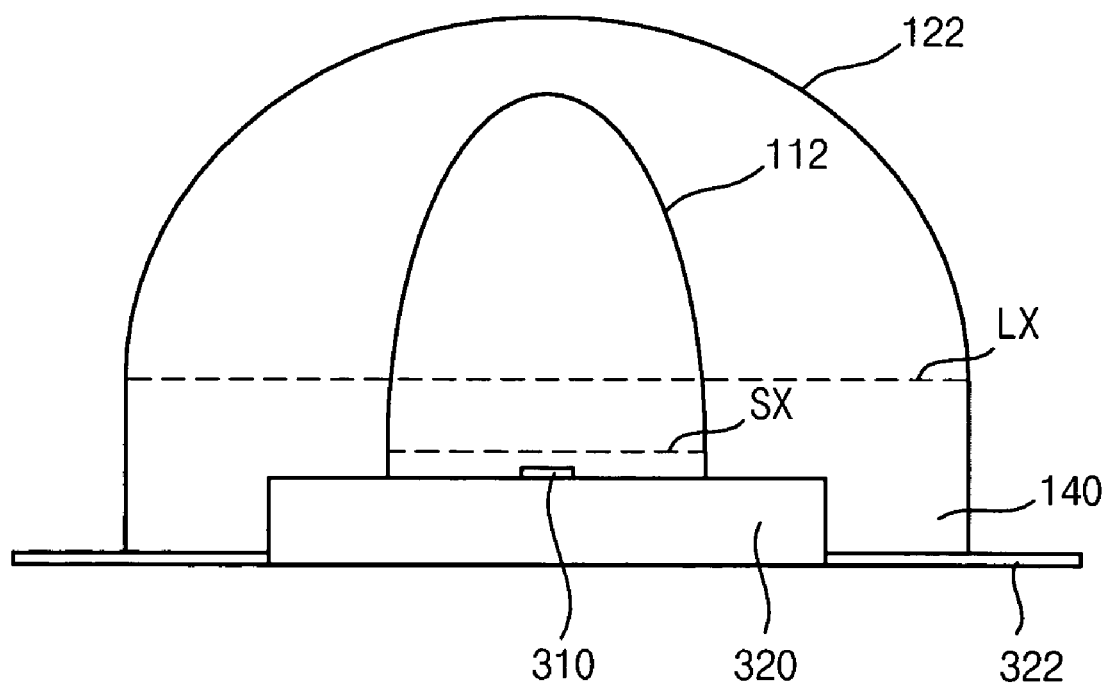
FIG. 4 is a cross-sectional view illustrating the optical module in FIG. 3.

FIG. 3 is an exploded perspective view illustrating an optical module according to an exemplary embodiment of the present invention, and FIG. 4 is a cross-sectional view illustrating the optical module in FIG. 3.

Referring to FIGS. 3 and 4, an optical module 300 according to the present embodiment includes a point light source device 310 and an optical lens 100.

The point light source device 310 is disposed at a central portion of the optical lens 100. For example, a red light emitting diode (red LED), a blue light emitting diode (blue LED), or a green light emitting diode (green LED) may be employed as the point light source device 310.

The optical module 300 further includes a socket 320. The point light source device 310 is disposed on the socket 320.

The optical lens 100 of the present embodiment is same as in the previous embodiment shown in FIGS. 1 and 2 except that the optical lens 100 further includes a fixing portion 140 for attachment to a socket 320. Thus, the same reference numerals will be used to refer to the same or like parts as those described in the previous embodiment in FIGS. 1 and 2 and any further explanation concerning the above elements will be omitted.

The point light source device 310 is disposed at a central portion. The point light source device 310 is disposed at a lower portion of the optical lens 100. In detail, the point light source device 310 is disposed under the minor axis SX of the first roughly ellipsoidal shape 112. Additionally, the point light source device 310 is disposed under the major axis LX of the second roughly ellipsoidal shape 122. For example, the point light source device 310 is disposed under the minor axis SX of the first roughly ellipsoidal shape 112 by about 0.36 mm, and under the major axis LX of the second roughly ellipsoidal shape 122 by about 0.25 mm.

The fixing portion 140 downwardly protrudes from the bottom face of the optical lens 100. The fixing portion 140 is combined with the socket 320, so that the point light source device 320 is disposed at the lower portion of the optical lens 100. The socket 320 is, for example, inserted into the optical lens 100 having the fixing portion 140 to be combined with the optical lens 100.

The point light source device 310 is formed on a central portion of the socket 320. The socket 320 is combined with the optical lens 100, so that the point light source device 100 is disposed in the hollow region defined by the inner curved surface having the first roughly ellipsoidal shape 112. When the socket 320 is employed, the optical lens 100 may be easily mated to the point light source device 310.

The socket 320 includes a pair of terminals 322. The terminals 322 are electrically connected to the point light source device 310. The point light source device 310 disposed at the socket 320 is electrically connected to a circuit board (not shown) through the terminals 322, so that electrical power is applied to the point light source device 310.

Figure 5:
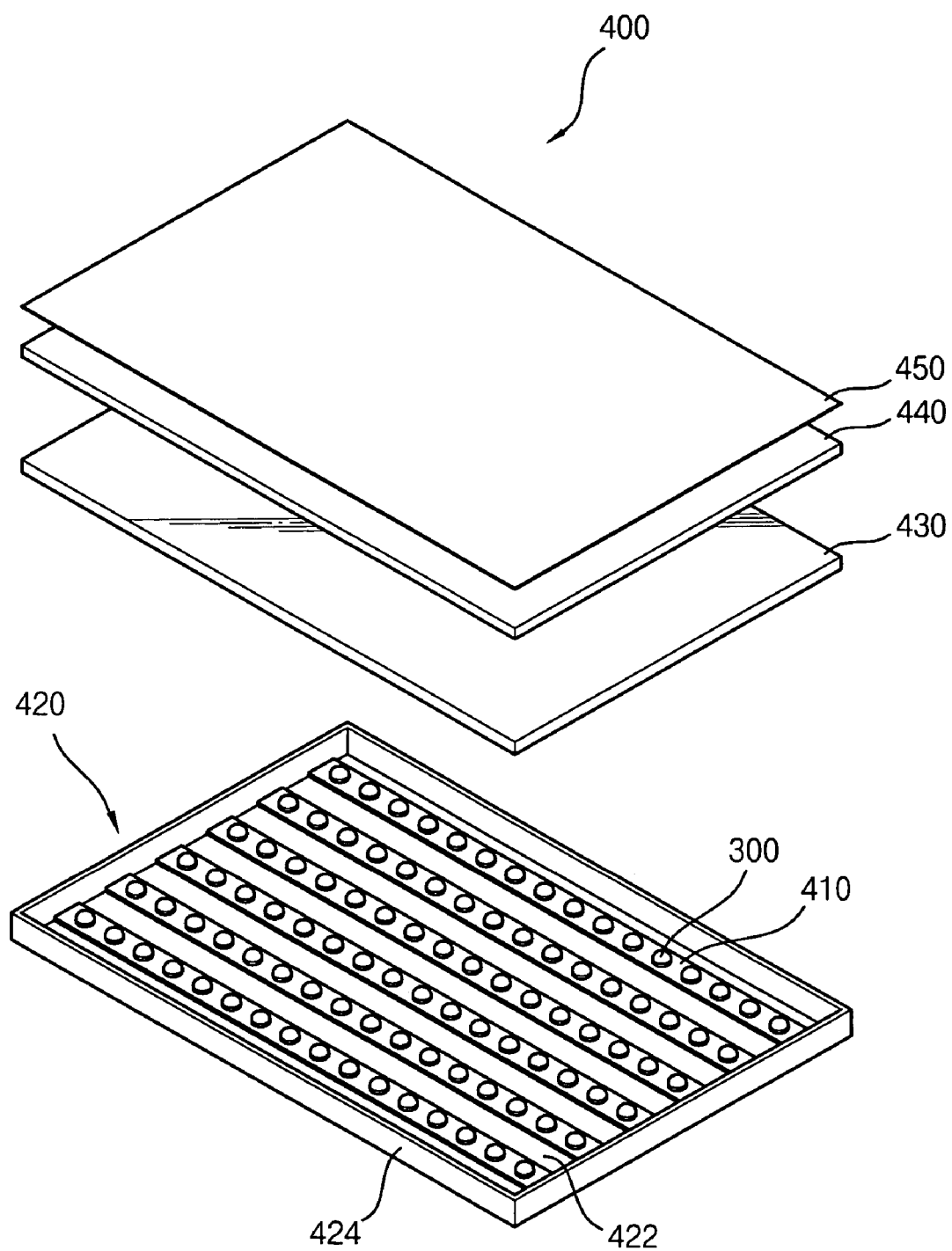
FIG. 5 is an exploded perspective view illustrating a backlight assembly according to an exemplary embodiment of the present invention.
Figure 6:
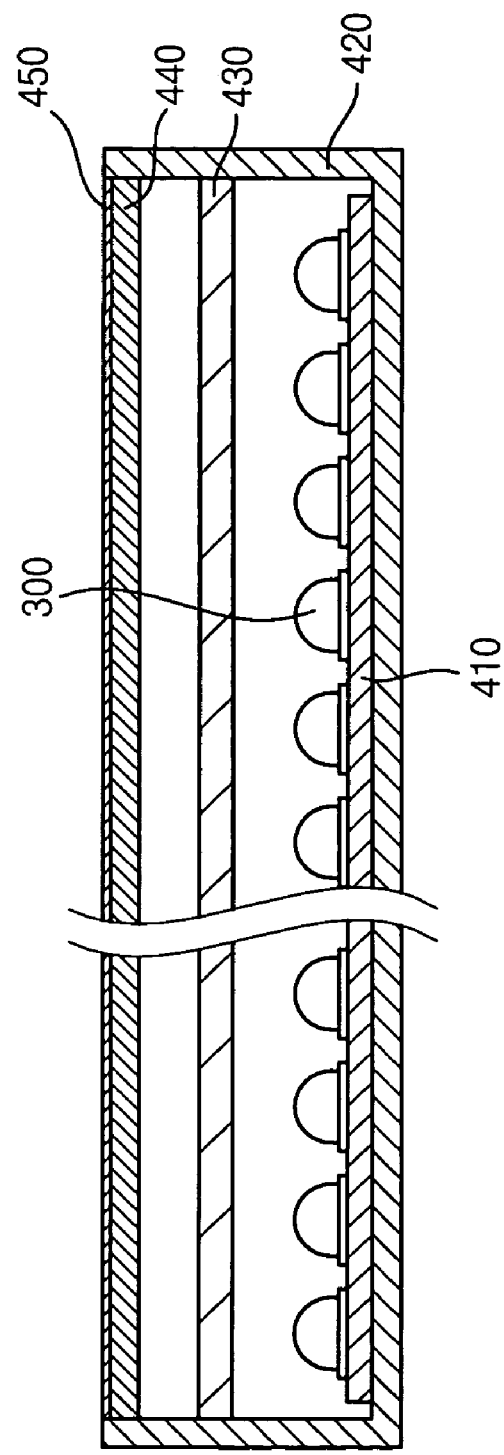
FIG. 6 is a cross-sectional view illustrating the backlight assembly in FIG. 5.

FIG. 5 is an exploded perspective view illustrating a backlight assembly according to an exemplary embodiment of the present invention, and FIG. 6 is a cross-sectional view illustrating the backlight assembly in FIG. 5.

Referring to FIGS. 5 and 6, a backlight assembly according to the present embodiment includes a circuit board 410, a plurality of optical modules 300 and a receiving container 420.

The circuit board 410 includes a thin plate having a power supply line (not shown) formed thereon. A printed circuit board (PCB), a metal coating printed circuit board (MCPCB), etc. may be used as the circuit board 410. Electric power is applied to the optical modules 300 through the power supply line (not shown) of the circuit board 410.

The optical modules 300 generate light. The optical modules 300 are disposed on the circuit board 410. Terminals 322 of each of the optical modules 300 are connected to terminals on the circuit board 410, so that the optical modules 300 are combined with the circuit board 410. Each of the optical modules 300 of the present embodiment is the same as in the previous embodiment shown in FIGS. 3 and 4. Thus, the same reference numerals will be used to refer to the same or like parts as those described in the previous embodiment shown in FIGS. 3 and 4 and any further explanation concerning the above elements will be omitted.

The backlight assembly 400 may include various light sources that generate different color from each other in order to generate white light. In detail, the backlight assembly 400 may include a red LED, a blue LED and a green LED. When red light generated by the red LED, blue light generated by the blue LED and green light generated by the green LED are mixed in proper ratios, white light is generated. When the backlight assembly 400 includes the red LED, the blue LED and the green LED, color reproducibility is enhanced. Alternatively, the backlight assembly may include LEDs that generate white light.

The receiving container 420 receives the optical modules 300. The receiving container 420 includes a bottom plate 422 and sidewalls 424. The sidewalls 424 upwardly protrude from edge portions of the bottom plate 422. The circuit board 410 is disposed on the bottom plate 422. The receiving container 420 comprises, for example, a metal.

The backlight assembly 400 optionally includes a light guiding member 430. The light guiding member 430 is disposed over the optical members 300. The light guiding member 430 is spaced apart from the optical members 300. The light guiding member 430 guides red, blue and green light generated from the red, blue and green LEDs, respectively, to mix the red, blue and green light, so that white light is generated. The light guiding member 430 may comprise, for example polymethylmethacrylate (PMMA).

The backlight assembly 400 optionally includes a light diffusing plate 440. The light diffusing plate 440 is disposed over the light guiding member 430. The light diffusing plate 440 is spaced a part from the light guiding member 430. The light diffusing plate 440 diffuses light that exits from the light guiding member 430 to enhance luminance uniformity. The light diffusing plate 440 has, for example a plate shape. The light diffusing plate 440 may comprise, for example polymethylmethacrylate (PMMA). The light diffusing plate 440 may include a light diffusing agent.

The backlight assembly 400 optionally includes an optical sheet 450. The optical sheet 450 is disposed over the light diffusing plate 440. The optical sheet 450 enhances optical characteristics of light that exits from the light diffusing plate 440. When the optical sheet 450 corresponds, for example, to a light condensing sheet, a front-view luminance is enhanced. When the optical sheet 450 corresponds, for example, to a light diffusing sheet, luminance uniformity is enhanced. Various kinds of optical sheets may be employed by the backlight assembly 400. Furthermore, the backlight assembly 400 may include more than one optical sheet.

Figure 7:
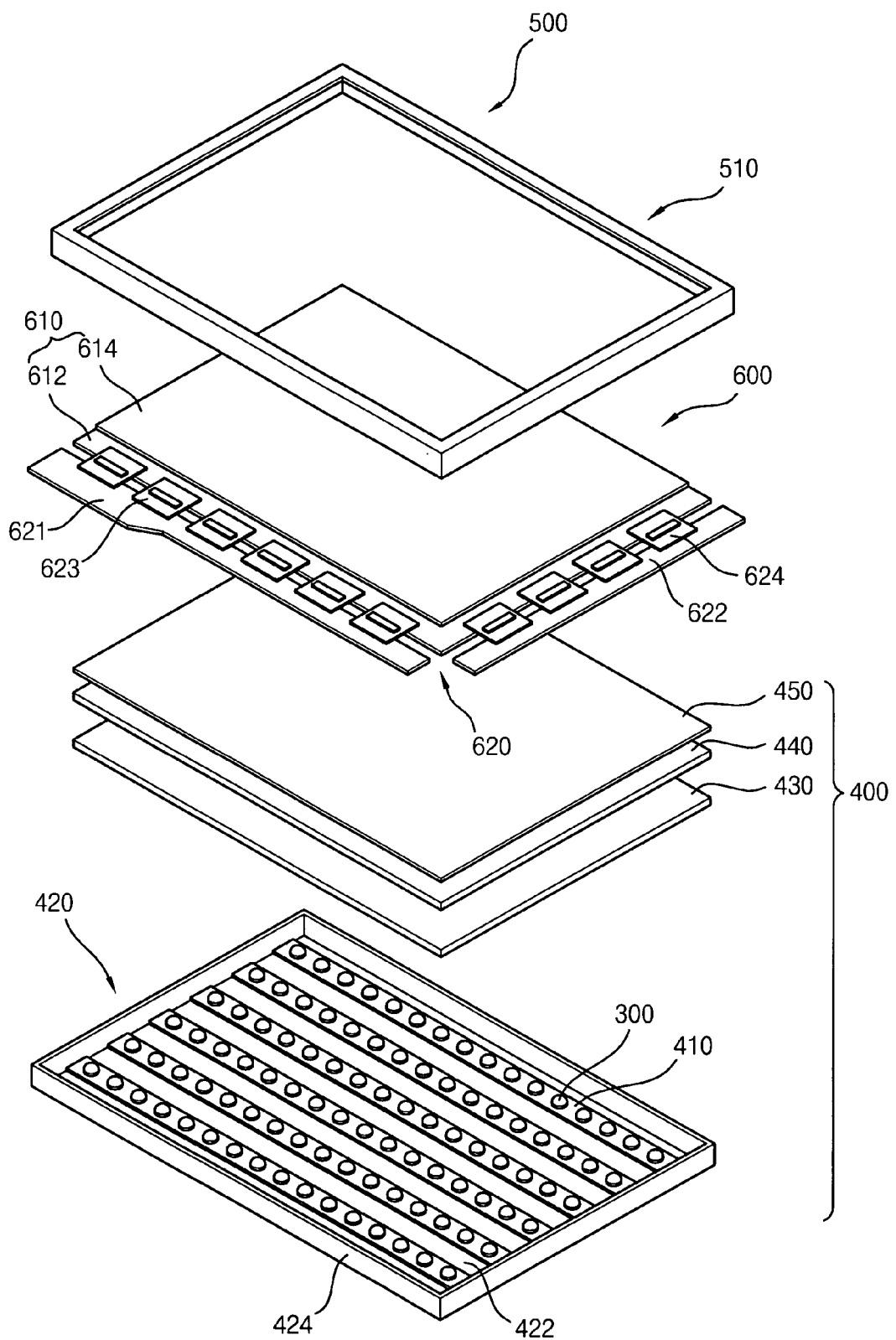
FIG. 7 is an exploded perspective view illustrating a display apparatus according to an exemplary embodiment of the present invention.

FIG. 7 is an exploded perspective view illustrating a display apparatus according to an exemplary embodiment of the present invention.

A display apparatus 500 according to the present embodiment includes a backlight assembly 400 and a display unit 600.

The backlight assembly includes the circuit board 410, a plurality of optical modules 300 and a receiving container 420. The backlight assembly 400 of the present embodiment is the same as in the previous embodiment shown in FIGS. 5 and 6. Thus, the same reference numerals will be used to refer to the same or like parts as those described in the previous embodiment shown in FIGS. 5 and 6 and any further explanation concerning the above elements will be omitted.

The display unit 600 includes a display panel 610 and a driving part 620. The display panel 610 displays an image by using light provided by the backlight assembly 400. The driving part 620 drives the display panel 610.

The display panel 610 includes a first substrate 612, a second substrate 614 and a liquid crystal layer (not shown). The first and second substrates 612 and 614 face each other. The liquid crystal layer (not shown) is disposed between the first and second substrates 612 and 614.

The first substrate 612 includes a first base substrate and a plurality of thin film transistors (TFTs) formed on the first base substrate. A glass substrate may be employed as the first base substrate. Each of the TFTs includes a gate electrode that is electrically connected to gate line, a source electrode that is electrically connected to one of data lines, or a drain electrode that is electrically connected to a pixel electrode. The pixel electrode includes an optically transparent and electrically conductive material.

The second substrate 614 includes a second base substrate, a color filter layer and a common electrode. The color filter layer is formed on the second base substrate. The color filter layer includes a red color filter, a blue color filter and a green color filter. The common electrode is formed on the color filter layer. The common electrode includes an optically transparent and electrically conductive material.

When a gate voltage is applied to the gate electrode of the TFT, the TFT is turned on, so that data voltage is applied to the pixel electrode through the TFT. When the data voltage is applied to the pixel electrode, electric fields are generated between the pixel electrode and the common electrode to alter an arrangement of liquid crystal molecules of the liquid crystal layer. When the arrangement of liquid crystal molecules of the liquid crystal layer is altered, optical transmissivity of the liquid crystal layer is changed, so that when light generated from the backlight assembly 400 passes through the liquid crystal layer, an image is displayed.

The driving part 620 includes a data printed circuit board (data PCB) 621, a gate printed circuit board (gate PCB) 622, a data flexible printed circuit (data FPC) 623 and a gate flexible printed circuit (gate FPC) 624. The data PCB 621 provides the display panel 610 with a data driving signal. The gate PCB 622 provides the display panel 610 with a gate driving signal. The data FPC 623 connects the data PCB 621 to the display panel 610. The gate FPC 624 connects the gate PCB 622 to the display panel 610.

A tape carrier package (TCP) or a chip on film (COF) may be employed as the data and gate FPCs 623 and 624. The display panel 610 may include a gate driving circuit, in which case the gate PCB 622 and the gate FPC 624 are not required.

The display apparatus 500 may further include a top chassis 510. The top chassis 510 surrounds edge portions of the display panel 610, and is combined with the receiving container 420 to fasten the display panel 610 to the receiving container 420. When the top chassis 510 is combined with the receiving container 420, the data FPC is bent so that the data PCB 621 is disposed along a side or the bottom plate of the receiving container 420. The top chassis 510 comprises, for example, a metal.

Figure 8:
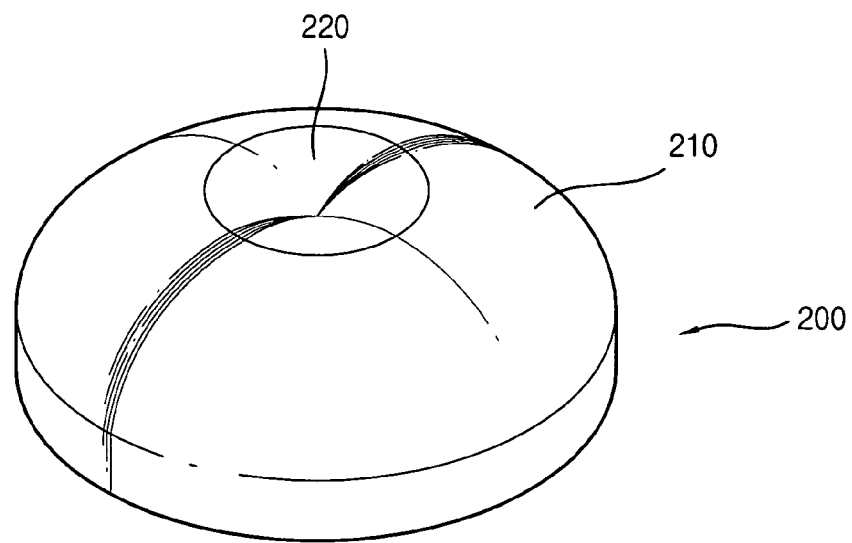
FIG. 8 is a perspective view illustrating a conventional optical lens according to a comparative example.

Referring to FIG. 8, a conventional optical lens 200 has an outer curved surface 210. The outer curved surface 210 has an ellipsoidal shape having a recessed portion 220. The recessed portion 220 is formed at a central portion of the optical lens 220.

Referring to FIG. 8, a conventional optical lens 200 has an outer curved surface 210. The outer curved surface 210 has an ellipsoidal shape having a recessed portion 220. The recessed portion 220 is formed at a central portion of the optical lens 220.

Figure 9:
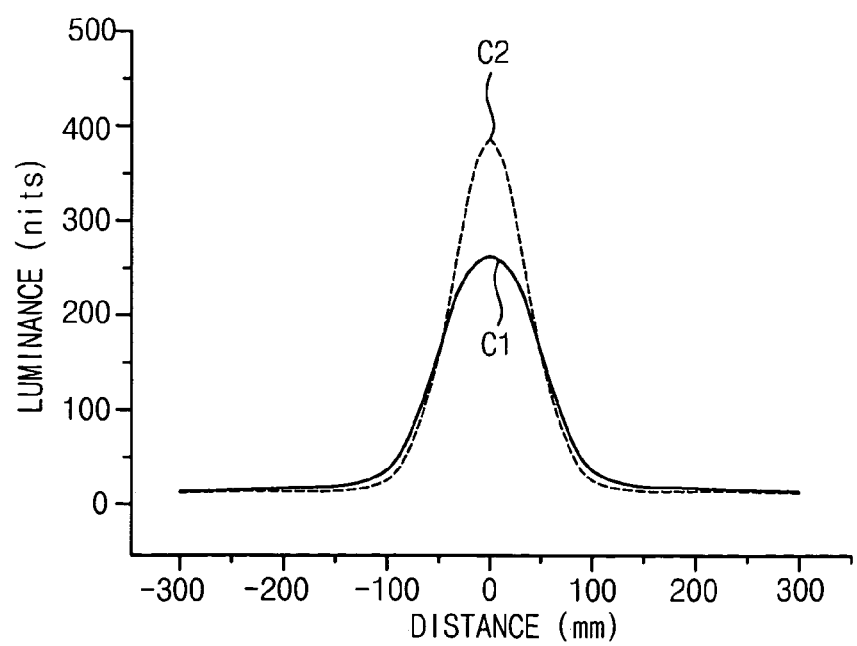
FIG. 9 is a graph illustrating the relationship of distance and luminance measured from the conventional optical module in FIG. 8 and the optical module in FIGS. 3 and 4.

Referring to FIG. 9, a graph C1 corresponds to the optical lens 100 in FIG. 1, and a graph C2 corresponds to the conventional optical lens 200 in FIG. 8. According to the graph C1, a luminance measured at a central portion of the optical lens 100 in FIG. 1 is about 265 nits. According to the graph C2, a luminance measured at a central portion of the conventional optical lens 200 in FIG. 8 is about 370 nits. That is, luminance of the conventional optical lens 200 in FIG. 8 is higher than luminance of the optical lens 100 in FIG. 1. However, regarding the effective light emitting radius that is defined as a double of standard deviation, the conventional optical lens 200 in FIG. 8 has an effective light emitting radius of about 64 mm, and the optical lens 100 in FIG. 1 has an effective light emitting radius of about 77 mm.

Therefore, luminance uniformity is enhanced. Furthermore, the optical lens 100 according to the present invention has an increased effective light emitting radius, so that the number of optical modules used in the display apparatus may be reduced to lower manufacturing cost thereof. Additionally, the optical lens 100 according to the present invention may be manufactured more easily than the conventional optical lens 200 due to the shape thereof.

Having described the exemplary embodiments of the present invention and its advantages, it is noted that various changes, substitutions and alterations can be made herein without departing from the spirit and scope of the invention as defined by appended claims.

What is claimed is:

1. An optical lens comprising:
   an inner curved surface having a first roughly ellipsoidal shape having a first major axis; and
   an outer curved surface having a second roughly ellipsoidal shape having a second major axis that is substantially perpendicular to the first axis;
   wherein light generated by a point light source device enters the optical lens through the inner curved surface and exits from the optical lens through the outer curved surface.

2. The optical lens of claim 1, wherein the first major axis is substantially vertical, and the second major axis is substantially horizontal.

3. The optical lens of claim 2, wherein the first and second roughly ellipsoidal shapes are expressed by, $$z = \frac{cr^2}{1+\sqrt{1-(1+k)c^2r^2}} + A_1 r + A_2 r^2 + \ldots + A_n r^n,$$

wherein 'z' represents a vertical distance from a point light source to a point of the inner or outer curved surface, 'r' represents a horizontal distance from the point light source to the point of the inner or outer curved surface, 'c' represents a curvature at a vertex, "k" represent a conic constant, A1 to An represent aberration coefficients of first through n-th order terms, respectively, and 'n' represents a whole number that is equal to or less than thirty.

4. The optical lens of claim 3, wherein the first roughly ellipsoidal shape has a radius of curvature of substantially equal to or less than about 5 mm at a first apex corresponding to the first major axis.

5. The optical lens of claim 4, wherein the first roughly ellipsoidal shape has the conic constant 'k' that is in a range of about –1 about 0.

6. The optical lens of claim 5, wherein the first roughly ellipsoidal shape has aberration coefficients A1 to An in a range of about –1 to about 1.

7. The optical lens of claim 3, wherein the second roughly ellipsoidal shape has a radius of curvature of substantially equal to or less than about 15 mm at a second apex corresponding to the second major axis.

8. The optical lens of claim 7, wherein the second roughly ellipsoidal shape has the conic constant 'k' in a range of about 0 to about 1.

9. The optical lens of claim 8, wherein the second roughly ellipsoidal shape has the aberration coefficients A1 to An in a range of about –1 to about 1.

10. The optical lens of claim 1, wherein the inner curved surface defines a circular opening, said circular opening being substantially perpendicular to the first major axis of the inner curved surface.

11. An optical module comprising:
    a point light source device for generating light; and
    an optical lens including an inner curved surface having a first roughly ellipsoidal shape having a first major axis and a first minor axis that is substantially perpendicular to the first major axis, and an outer curved surface having a second roughly ellipsoidal shape having a second major axis that is substantially perpendicular to the first axis and the second minor axis that is substantially perpendicular to the second major axis, the light generated by the point light source device entering the optical lens through the inner curved surface and exiting from the optical lens through the outer curved surface.

12. The optical module of claim 11, wherein the first major axis is substantially vertical, and the second major axis is substantially horizontal.

13. The optical module of claim 12, wherein the point light source device is disposed under the first minor axis of the first roughly ellipsoidal shape.

14. The optical module of claim 12, wherein the point light source device is disposed under the second minor axis of the second roughly ellipsoidal shape.

15. The optical module of claim 12, wherein the point light source device corresponds to a light emitting diode.

16. The optical module of claim 12, wherein the first and second roughly ellipsoidal shapes are expressed by, $$z = \frac{cr^2}{1+\sqrt{1-(1+k)c^2r^2}} + A_1 r + A_2 r^2 + \ldots + A_n r^n,$$

wherein 'z' represents a vertical distance from a point light source to a point of the inner or outer curved surface, 'r' represents a horizontal distance from the point light source to the point of the inner or outer curved surface, 'c' represents a curvature at a vertex, 'k' represent a conic constant, A1, A2, . . . , An represent aberration coefficients of first through n-th order term, respectively, and 'n' represents a whole number that is equal to or less than thirty.

17. The optical module of claim 16, wherein the first roughly ellipsoidal shape has a radius of curvature of substantially equal to or less than about 5 mm at a first apex corresponding to the first major axis.

18. The optical module of claim 17, wherein the first roughly ellipsoidal shape has the conic constant 'k' in a range of about –1 to about 0.

19. The optical module of claim 18, wherein the first roughly ellipsoidal shape has aberration coefficients A1 to An in a range of about –1 to about 1.

20. The optical module of claim 16, wherein the second roughly ellipsoidal shape has a radius of curvature of substantially equal to or less than about 15 mm at a second apex corresponding to the second major axis.

21. The optical module of claim 20, wherein the second roughly ellipsoidal shape has the conic constant 'k' in a range of about 0 to about 1.

22. The optical module of claim 21, wherein the second roughly ellipsoidal shape has the aberration coefficients A1 to An in a range of about –1 to about 1.

23. The optical module of claim 12, further comprising a socket coupled to the optical lens, wherein the point light source device is provided on the socket.

24. The optical module of claim 11, wherein the inner curved surface defines a hollow inner region.

25. A backlight assembly comprising:
    a circuit board;
    a receiving container receiving flip circuit board; and
    a plurality of optical modules disposed on the circuit board, each of the optical modules comprising:
    a point light source device for generating light; and
    an optical lens including an inner curved surface having a first roughly ellipsoidal shape having a first major axis and a first minor axis that is substantially perpendicular to the first major axis, and an outer curved surface having a second roughly ellipsoidal shape having a second major axis that is substantially perpendicular to the first axis and the second minor axis that is substantially perpendicular to the second major axis, the light generated by the point light source device entering the optical lens through the inner curved surface and exiting from the optical lens through the outer curved surface.

26. The backlight assembly of claim 25, wherein the first major axis is substantially vertical, and the second major axis is substantially horizontal.

27. The backlight assembly of claim 26, wherein the light source device comprise one of a first light source that generates red light, a second light source that generates blue light, and a third light source that generates green light source.

28. The backlight assembly of claim 26, wherein for each of the optical modules, the point light source device is disposed under the first and second minor axes of the first and second roughly ellipsoidal shapes.

29. The backlight assembly of claim 26, wherein the first roughly ellipsoidal shape has a radius of curvature of substantially equal to or less than about 5 mm at a first apex corresponding to the first major axis.

30. The backlight assembly of claim 26, wherein the second roughly ellipsoidal shape has a radius of curvature of substantially equal to or less than about 15 mm at a second apex corresponding to the second major axis.

31. The backlight assembly of claim 26, further comprising a socket coupled to the optical lens, wherein the point light source device is provided on the socket and is electrically connected to the circuit board through the socket.

32. The backlight assembly of claim 26, further comprising a light guiding member disposed over the optical modules, the light guiding member guiding the light generated by the point light source device to mix the light.

33. The backlight assembly of claim 32, further comprising a light diffusing plate disposed over the light guiding member.

34. The backlight assembly of claim 25, wherein the inner curved surface defines a hollow inner region.

35. A display apparatus comprising:
a display panel that displays an image by using light; and
a backlight assembly that provides the display panel with the light, the backlight assembly comprising, a circuit board, a receiving container receiving the circuit board, and a plurality of optical modules disposed on the circuit board, each of the optical modules comprising:
a point light source device for generating light; and
an optical lens including an inner curved surface having a first roughly ellipsoidal shape having a first major axis and a first minor axis that is substantially perpendicular to the first major axis, and an outer curved surface having a second roughly ellipsoidal shape having a second major axis that is substantially perpendicular to the first axis and the second minor axis that is substantially perpendicular to the second major axis, the light generated by the point light source device entering the optical lens through the inner curved surface and exiting from the optical lens through the outer curved surface.

36. The display apparatus of claim 35, wherein the first major axis is substantially vertical, and the second major axis is substantially horizontal.

37. The display apparatus of claim 36, wherein for each of the optical modules, the point light source device is disposed under the first and second minor axes of the first and second roughly ellipsoidal shapes.

38. The display apparatus of claim 36, wherein the first roughly ellipsoidal shape has a radius of curvature of substantially equal to or less than about 5 mm at a first apex corresponding to the first major axis.

39. The display apparatus of claim 36, wherein the second roughly ellipsoidal shape has a radius of curvature of substantially equal to or less than about 15 mm at a second apex corresponding to the second major axis.

40. The display apparatus of claim 32, wherein the inner curved surface defines a hollow inner region.

* * * * *